United States Patent [19]
Frankeny et al.

[11] Patent Number: 5,923,276
[45] Date of Patent: Jul. 13, 1999

[54] CURRENT SOURCE BASED MULTILEVEL BUS DRIVER AND CONVERTER

[75] Inventors: Richard Francis Frankeny, Elgin; Krishnamurthy Venkatramani, Austin, both of Tex.

[73] Assignee: International Business Machines Corporation, Armonk, N.Y.

[21] Appl. No.: 08/770,602

[22] Filed: Dec. 19, 1996

[51] Int. Cl.$^6$ .............................. H03M 1/36; H03M 1/42
[52] U.S. Cl. ............................................ 341/155; 395/445
[58] Field of Search ..................................... 341/155, 159; 370/211; 395/444, 445, 447, 427, 471

[56] References Cited

U.S. PATENT DOCUMENTS

| | | | |
|---|---|---|---|
| 4,035,784 | 7/1977 | Brown ...................................... | 340/173 |
| 4,453,121 | 6/1984 | Noufer . | |
| 4,604,704 | 8/1986 | Gandini et al. . | |
| 4,614,882 | 9/1986 | Parker et al. . | |
| 4,634,894 | 1/1987 | Shu et al. . | |
| 4,638,473 | 1/1987 | Cooperman et al. . | |
| 4,698,800 | 10/1987 | Cavaliere et al. . | |
| 4,703,198 | 10/1987 | Porter et al. . | |
| 4,713,827 | 12/1987 | Lauffer et al. . | |
| 4,736,293 | 4/1988 | Patrick . | |
| 4,756,006 | 7/1988 | Rickard . | |
| 4,757,442 | 7/1988 | Sakata ..................................... | 364/200 |
| 4,859,877 | 8/1989 | Cooperman et al. . | |
| 4,890,010 | 12/1989 | Neudeck et al. . | |
| 4,975,599 | 12/1990 | Petrovick, Jr. et al. . | |
| 5,004,986 | 4/1991 | Bohrer . | |
| 5,030,855 | 7/1991 | Leung . | |
| 5,095,231 | 3/1992 | Sartori et al. . | |
| 5,105,295 | 4/1992 | O'Byrne . | |

(List continued on next page.)

FOREIGN PATENT DOCUMENTS 504063 9/1919 France .

OTHER PUBLICATIONS

IBM TDB "Split Cache with Variable Interleave Boundary", vol. 22, No. 11, Apr. 1980, pp. 5183–5186.
IBM TDB "Improved Cost, Performance, and Reliability by Simultaneous Accesses to Pipelined Caches with Duplicate Data Protection and Enhanced Multiprocessor Performance", vol. 33, No. 1A, Jun. 1990, pp. 264–265.
IBM TDB "Simultaneous Bidirectional Baseband Data Transmission", vol. 11, No. 7, Dec. 1968, pp. 762–763.
IBM TDB "Bidirectional Communications Within a Binary Switching System", vol. 18, No. 9, Feb. 1976, pp. 2865–2866.
IBM TDB "Component Mismatch Accommodation for Bidirectional Chip to Chip Communication", vol. 22, No. 11, Apr. 1980, pp. 5029–5031.
IBM TDB "Simultaneous Bidirectional Transceiver Circuit". vol. 23, No. 4, Sep. 1980, pp. 1435–1437.
IBM TDB "Failure–Tolerant Self–Testing Driver/Receiver", vol. 30, No. 3, Aug. 1987, pp. 1215–1220.
1990 IEEE, Dept. of Electrical Engineering & Computer Science, MIT, "Simultaneous Bidirectional Signalling for IC Systems", Lam et al, pp. 430–433.

*Primary Examiner*—Brian Young
*Assistant Examiner*—Peguy JeanPierre
*Attorney, Agent, or Firm*—Casimer K. Salys

[57] ABSTRACT

A current source based multilevel bus driver and converter suitable to simultaneously insect precise magnitudes of current from multiple locations into common lines of a bus and then detect analog sums of the net current. The analog current sums so detected are decoded into digital equivalents corresponding to the respective current injection sources. In a typical application the current source drivers and converter are Located on separate integrated circuit chips. The reference node common to all the chips allows a reference generator on each chip to precisely define bias and transmitted current levels suitable to ensure precise values of injected current and to accurately differentiate between analog current levels in each line as an aspect of conversion into digital form and attribution as to origin.

20 Claims, 9 Drawing Sheets

U.S. PATENT DOCUMENTS

| | | |
|---|---|---|
| 5,107,230 | 4/1992 | King . |
| 5,111,080 | 5/1992 | Mizukami et al. . |
| 5,134,311 | 7/1992 | Biber et al. . |
| 5,157,269 | 10/1992 | Jordan et al. . |
| 5,165,046 | 11/1992 | Hesson . |
| 5,173,656 | 12/1992 | Seevinck et al. . |
| 5,206,544 | 4/1993 | Chen et al. . |
| 5,216,667 | 6/1993 | Chu et al. . |
| 5,218,248 | 6/1993 | Nagao . |
| 5,260,612 | 11/1993 | Lehmann et al. . |
| 5,283,761 | 2/1994 | Gillingham . |
| 5,313,118 | 5/1994 | Lundberg . |
| 5,329,190 | 7/1994 | Igarashi et al. . |
| 5,373,226 | 12/1994 | Kimura . |
| 5,382,841 | 1/1995 | Feldbaumer . |
| 5,399,960 | 3/1995 | Gross . |
| 5,414,583 | 5/1995 | Jordan . |
| 5,418,475 | 5/1995 | Otaka . |
| 5,422,608 | 6/1995 | Levesque . |
| 5,438,282 | 8/1995 | Kuo . |
| 5,440,182 | 8/1995 | Dobbelaere . |
| 5,448,159 | 9/1995 | Kojima et al. . |
| 5,453,679 | 9/1995 | Rapp . |
| 5,463,331 | 10/1995 | Kuo . |
| 5,466,975 | 11/1995 | Wratten . |
| 5,479,636 | 12/1995 | Vanka et al. . |
| 5,481,207 | 1/1996 | Crafts . |
| 5,490,253 | 2/1996 | Laha et al. . |
| 5,687,326 | 11/1997 | Robinson ................................. 395/385 |

BIT 1 TURNS ON MOMENTARILY UNTIL BIT 2 SWITCHES ON OFFSET $i_T$

BIT 1 TURNS ON AGAIN BECAUSE SIGNAL EXCEEDS THRESHOLD EVEN WITH OFFSET = $i_T$

TERMINATOR

CURRENT SOURCE BASED MULTILEVEL BUS DRIVER AND CONVERTER

CROSS REFERENCE TO RELATED APPLICATIONS

The present application is related to U.S. Pat. Nos. 5,815,107, 5,793,233, and 5,760,601. All the applications are assigned to the assignee of the present application.

FIELD OF THE INVENTION

The present invention relates generally to multilevel coding and decoding of signals. More particularly, the invention is directed to multilevel current source driving, detection, and use in late selection of cache data in a digital processing system.

BACKGROUND OF THE INVENTION

A digital data processing systems, and in particular computer processors, continually press for higher operating frequencies as typically measured by clock rates. With processors having multiple execution units it is not at all unusual to have instructions executed completely with one clock cycle. In those contexts, instructions and data must be accessible at the same clock rate if processor stalls are to be avoided. In furtherance of this objection, modern computer systems have processors with cache memories, often of multiple levels, the memory designs being refined to exhibit accessing rates approaching the processor clock rates. A generalized example of such a system is schematically depicted in FIG. 1, where processor 1 having onboard level 1 (L1) cache 2 is connected through level 2 (L2) cache 3 to system bus 4. As commonly implemented, system bus 4 also has attached thereto input/output communication resource 6 as well as main memory 7. Furthermore, in contemporary computer systems it is not at all unusual to have multiple processors, such as processor 8, also connected to system bus 4.

Given the contention for access to bus 4 in pursuit of instructions and data originally stored in main memory 7, processor 1 utilizes L2 cache 3 and L1 cache 2 to improve the match between the clock rate capability of processor 1 and the read and write access capabilities of the various memory devices storing instructions and data. Since cache architectures are well known by those routinely practicing in the contemporary computer processor technologies, it should be sufficient to note that lines of data A from main memory 7 are stored as cache lines in L2 cache 3, generally at 9, with their associated address tags, generally at 11. Some cache lines and related address tags are also stored in L1 level cache 2, that being a subset of what is in larger L2 cache 3, which is itself a subset of the information stored in main memory 7. Note that L1 cache 2 is shown within the boundaries of processor 1, the depiction representing a typical modern processor architecture in which the L1 cache is on a common integrated circuit chip with the processor. In contrast, the materially larger L2 cache resides on one or more separate integrated circuit chips.

FIG. 2 schematically depicts the elements of a typical L1 cache, where the cache is physically located on the same integrated circuit chip with a processor and is two-way set associative to optimize the match between the clock rate capability of the processor and the access capability of the cache memory. The architecture is commonly referred to as being a "late select", in that data is simultaneously extracted from both banks of the cache and stored in a set of registers for selective transfer to the processor late in the clock cycle. The select signal which defines the data set provided to the processor, from the data sets on bus 1 and bus 2, is derived from a search of the address tags in the two halves of the cache by the search engine. With the processor clock rates being so high, there is insufficient time to search the address tags, to identify which section of the cache holds the data for the specified address, and to access and transfer that data to the processor all within the clock cycle. In fact, the practice depicted in FIG. 2 transmits both data sets potentially defined by the requested address to a late select multiplexer just outside the processor, and in parallel time resolves the search of the address tags to decide, and late select, between the two.

Though the architecture depicted in FIG. 2 is suitable for most on-chip applications, it is not considered suitable for designs in which the processor and cache memory reside on separate chips in that two full 64-bit bus lines (assuming a 32-bit processor architecture) must extend across the printed circuit board for each section of the cache. The duplication of bus lines from the cache sections to a location immediately proximate or actually into the processor chip is not considered viable from a printed circuit board real estate, processor pin-out and cost perspective.

FIG. 3 schematically illustrates the conventional implementation of a 2-way set associative cache in which the cache memory chip or chips are connected through a common board level bus to the processor, the processor itself residing on a separate chip. Though the common bus avoids the bus line duplication noted earlier, it does not provide the capability for late selection in that the data must move over a single bus. Therefore, in the context of the architecture in FIG. 3, designers often have the search engine undergo a speculative selection between the cache sections, place that data on the board level data bus for access by the processor, and, late in the clock cycle, confirm the validity of the data. When the speculative architecture in FIG. 3 chooses the wrong cache section, a multiple clock cycle delay is needed to replace the data with that from the other cache section. Since the run lengths and capacitive loading of board level wiring lines are significantly greater than those associated with cache lines internal to an integrated circuit chip, it is not possible to switch within a clock cycle between cache sections when a speculative choice is found to be incorrect.

Therefore, what is needed is an architecture for an associative cache in which the cache memory and the processor reside on separate integrated circuit chips while sharing a common board level bus, yet can within a clock cycle provide the data from the correct cache section to the processor in the context of having to complete an address tag search of both cache sections. In a more generalized sense, there is a need for resources by which multilevel signals originating in different devices can be transmitted simultaneously over the same line and decoded at a common receiving end for appropriate binary level attribution to the respective transmitting devices. The desired multilevel transmission and conversion back to binary form should avoid the common problems attributable to multilevel voltage transmission as experienced in the prior art.

SUMMARY OF THE INVENTION

The problems in the prior art are addressed and solved through a late selection architecture for a set associative cache having two or more cache sections that provide data to a processor over a common bus, comprising a means for selecting digital data for addresses in the cache sections, means for generating analog currents in amounts attributable to cache sections and in response to the digital data selected in the cache sections, means for injecting the generated analog currents into lines of the common bus, means for detecting net analog currents injected in lines of the common bus, means for converting the detected net analog currents into digital data attributable to individual cache sections, and means for selecting the desired digital data from among digital data attributable to individual cache sections in response to a late select signal.

In another form, the invention is directed to apparatus for simultaneously transmitting digital data over a common bus using multilevel current sources and current summing, comprising means for generating in a first device connected to the common bus currents of first or second magnitude in representation of respective first or second binary states in the first device, means for generating in a second device connected to the common bus currents of first or third magnitude in representation of respective first or second binary states in the second device, means for selectively injecting first or second magnitude currents from the first device, and first or third magnitude currents from the second device, into a first line of the bus responsive to the binary states to be represented by each device on the first line, means for detecting respective individual net sums of injected currents in the first line of the bus, reference node linking the means for generating in the first device, the means for generating in the second device, and the means for detecting respective individual net sums, to provide a common reference voltage for deriving the first, second and third magnitude currents, and means for converting detected net sums of injected current into first and second binary values individually attributable to first and second devices responsive to the voltage on the reference node.

In an particularized form, a two-way set associative cache situated on an integrated circuit chip distinct from the processor is connected to a board level data bus common to the processor integrated circuit device. The two sections of the cache are simultaneously addressed and have their respective binary data simultaneously provided onto the data bus through respective current source drivers generating distinct current levels. A multilevel converter interfaces the data bus at the processor integrated circuit device, the multilevel converter detecting and decoding the net currents on the lines of the data bus into binary values respectively associated with the two cache sections. Late selection is accomplished by signals from the search engine responsive to address tags in the respective cache sections using a multiplexer situated on the processor integrated circuit device. Current levels are accurately generated and decoded through the use of a reference node common to all current source drivers and the multilevel converter.

As further generalized, the invention provides resources for having two data sources generate respective current levels to drive a common line, with the current sum being detected and decoded in a multilevel converter located distinct from the two data sources.

These and other features of the invention will be more clearly understood and appreciated upon considering the detailed embodiment which is set forth hereinafter.

DESCRIPTION OF THE PREFERRED EMBODIMENT

Figure 1:
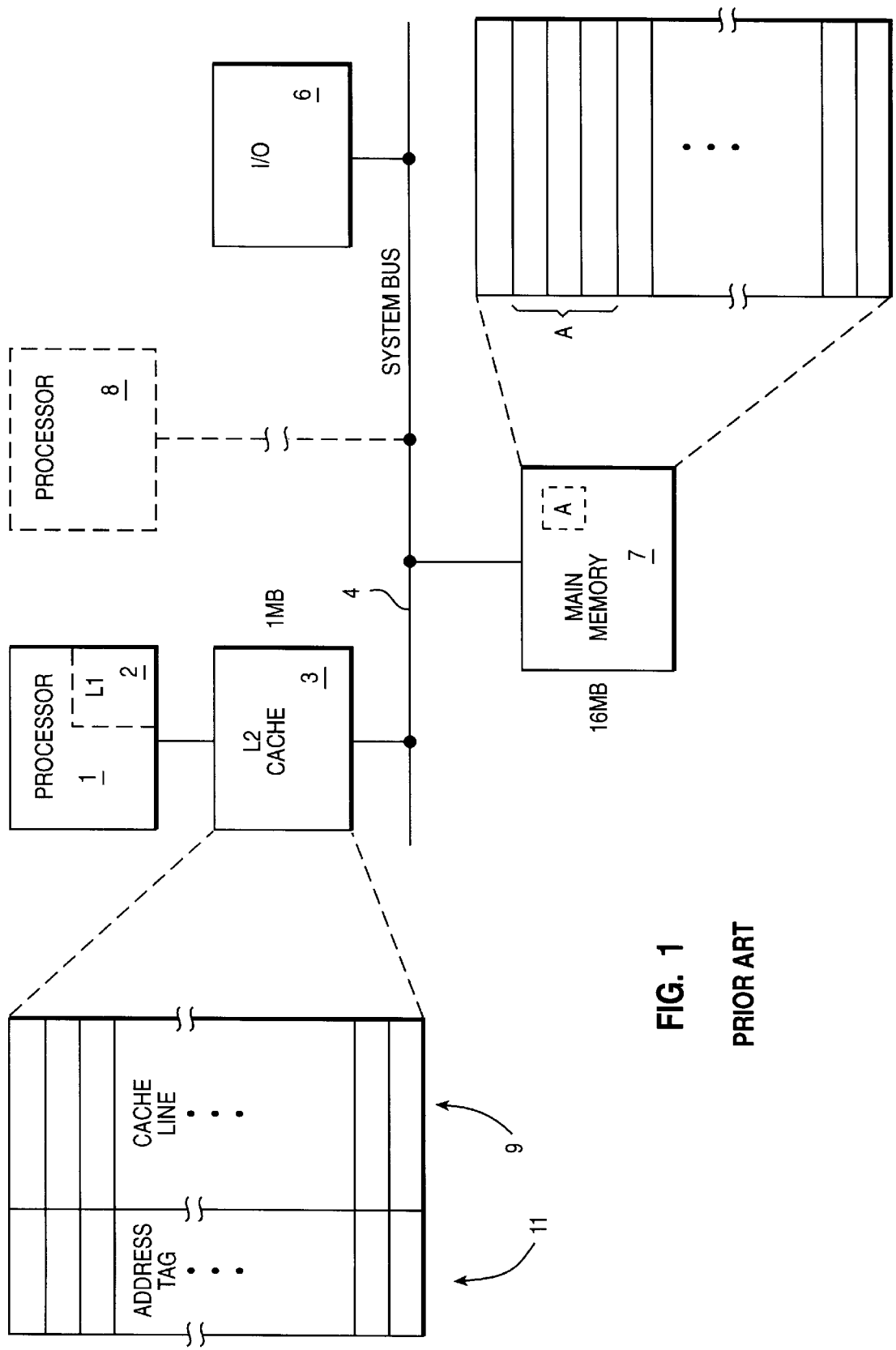
FIG. 1 is a schematic block diagram of classical computer system.
Figure 2:
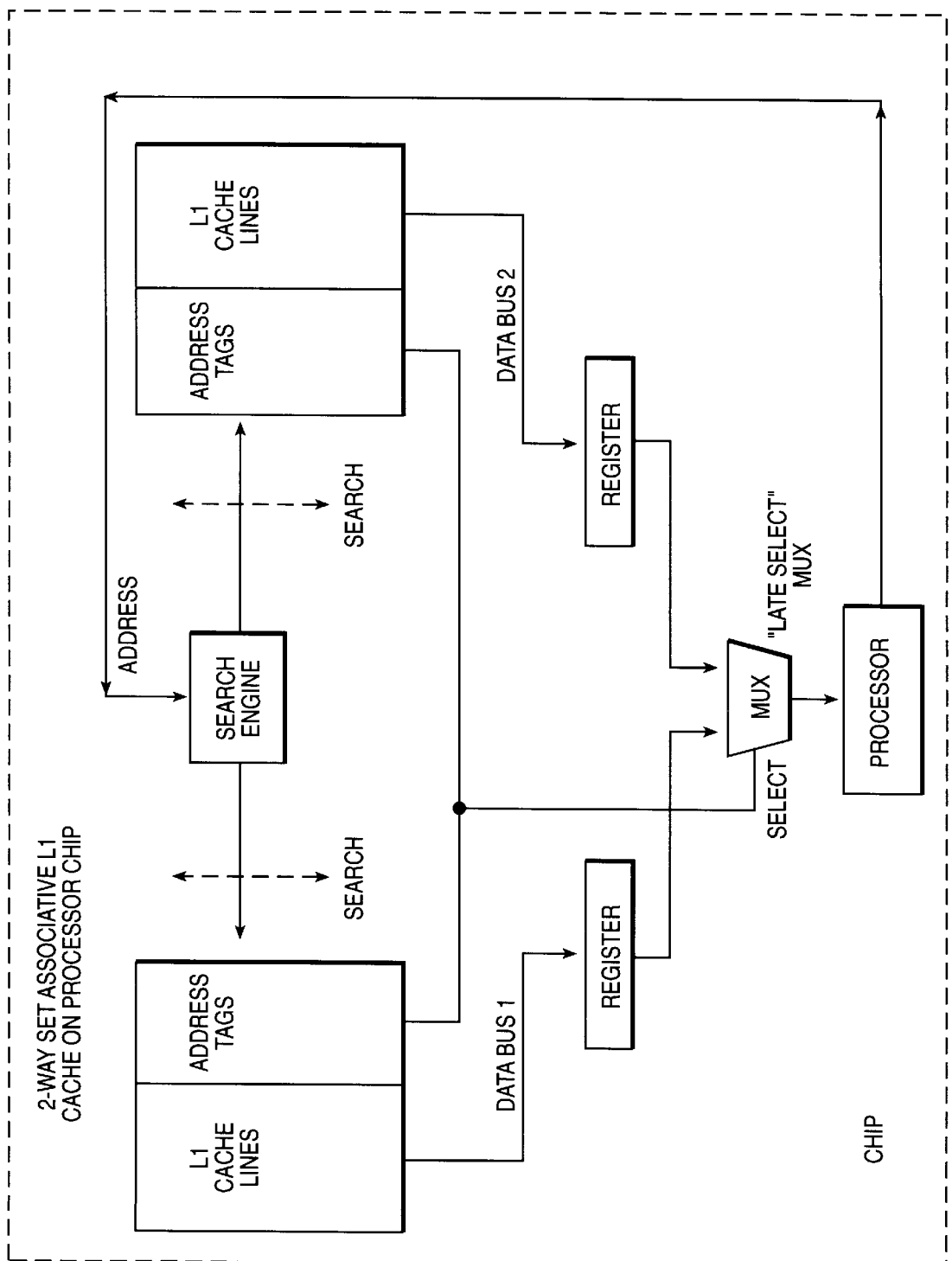
FIG. 2 is a schematic block diagram of a processor and on-board cache with late select.
Figure 3:
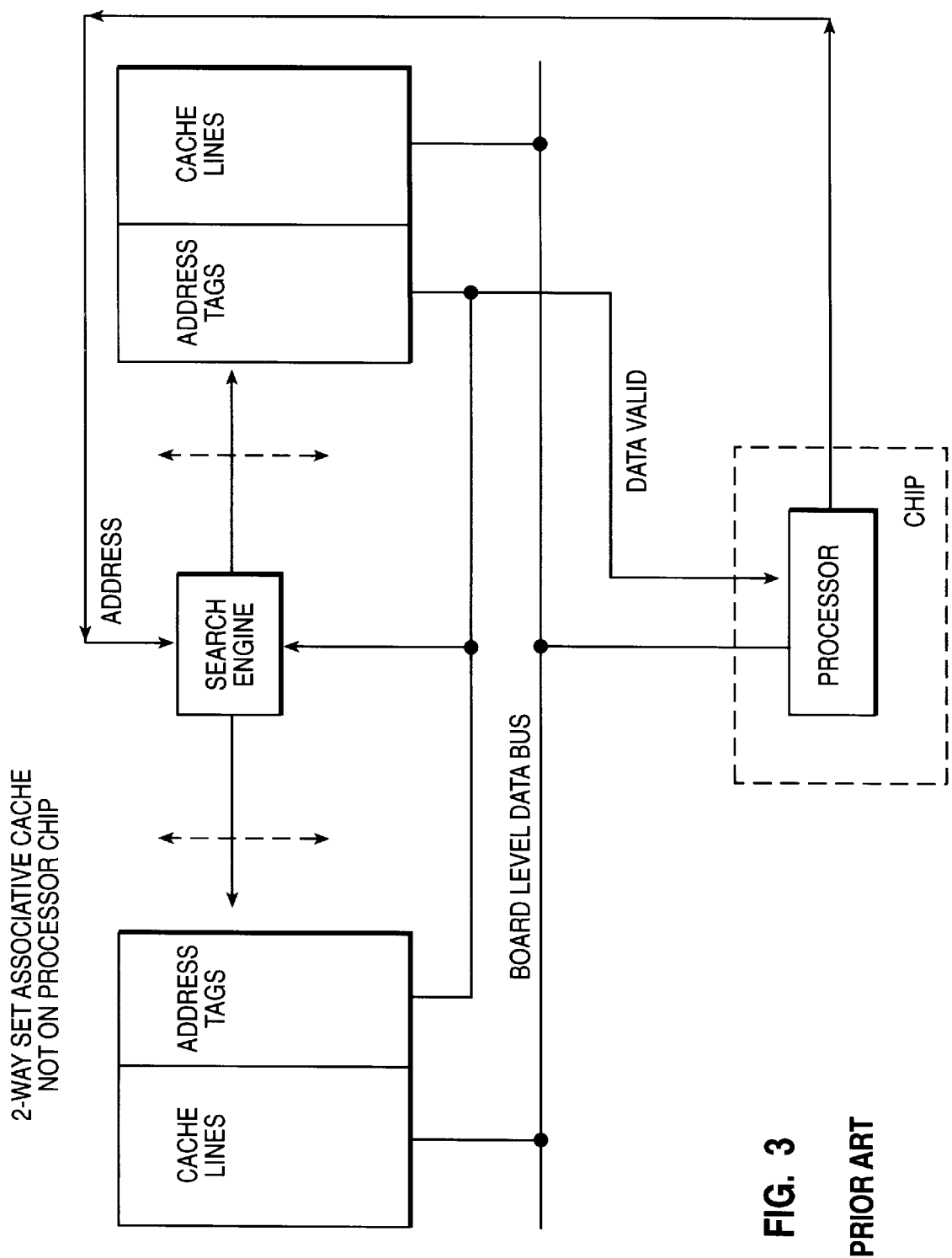
FIG. 3 is a schematic block diagram of a processor and cache system utilizing speculative selection and late validation.
Figure 4:
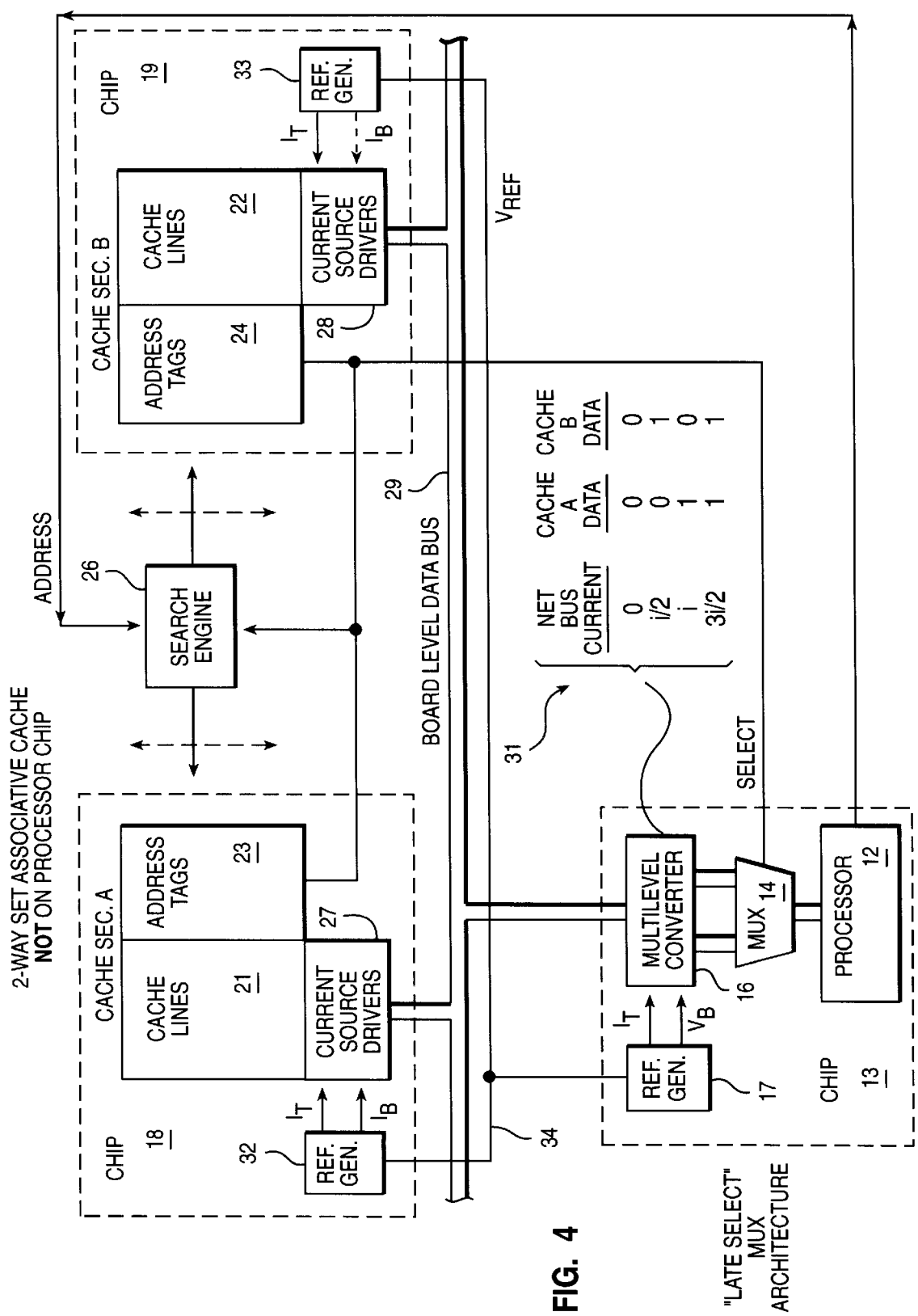
FIG. 4 is a schematic block diagram depicting a board level embodiment of the invention including separate processor and cache integrated circuit chips.

FIG. 4 depicts by block diagram a preferred embodiment of the invention in the context of a computer system with processor integrated circuit, set associative cache integrated circuit, and a board level data bus. As preferably embodied, processor 12 is situated on integrated circuit chip 13, chip 13 including multiplexer 14, multilevel converter 16 and reference generator 17. FIG. 4 also depicts the presence of a two-way set associative cache comprised of two cache sections individually situated on separate integrated circuit chips 18 and 19. Each cache section, identified individually as cache section A and cache section B, includes respective associated memory array 21 and 22 for storing digital data in the form of cache lines, and respectively associated address tags 23 and 24. Search engine 26 receives addresses from processor 12, and searches address tags 23 and 24 to select. the appropriate cache section, and accesses cache lines of data from cache memory sections 21 and 22. The "late select" signal is transmitted to multiplexer 14.

Particularly unique to the present invention is the use of multiple current source drivers 27 and 28 associated with respective cache memory sections 21 and 22. Current source drivers 27 and 28 inject currents into board level data bus 29 individually by line based upon the binary content of the data to be transmitted for such line. The levels of currents provided by drivers 27 and 28 differ.

Multilevel converter 16 connected to bus 29 detects the analog sums of the currents on the lines of bus 29 and decodes from such net line currents the binary equivalents by line of the data being provided by cache sections 21 and 22. The relationship between net bus line current and digital data are presented at 31 in FIG. 4 and set forth in Table A, below.

TABLE A

| Net Bus Current in a Bus Line | Cache A Data | Cache B Data |
| --- | --- | --- |
| 0 | 0 | 0 |
| i/2 | 0 | 1 |
| i | 1 | 0 |
| 3i/2 | 1 | 1 |

Note that the current values identified as net bus currents in Table A are relative to bias currents to be described hereinafter.

Selection between cache sections, and the associated choice of the data to be presented to processor 12, is accomplished by multiplexer 14. The operation can be performed late in the cache read clock cycle since data from both sections of the cache are read from the cache sections, transmitted, fully decoded, and available on the processor chip 13 when the final selection is received from search engine 26.

An important aspect of the invention involves the accurate generation and differentiate of current levels in the context of field effect transistor implemented integrated circuit devices. Early concepts were introduced in U.S. Pat. No. 5,568,064, the subject matter of which is incorporated herein by reference. Later refinements, as will be described hereinafter, appeared in U.S. patent application Ser. No. 08/703,317, filed Aug. 26, 1996, the subject matter of which is incorporated herein by reference, and in U.S. patent application Ser. No. 08/703,318, filed Aug. 26, 1996, the subject matter of which is also incorporated herein by reference. Accurate generation of current source signals, detection of current levels, and conversion to binary are accomplished through the use of reference generators 17, 32 and 33, where reference generator 17 resides on processor chip 13, reference generator 32 resides on integrated circuit chip 18 in common with cache section A, and reference generator 33 resides on integrated circuit chip 19 in common with cache section B. Reference generators 17, 32, and 33 are linked by line 34 having a common node voltage $V_{ref}$. The voltage on line 34 establishes a mutually derived voltage level which is then used by each reference generator to accurately replicate corresponding levels of transmitted current ($I_T$), bias current ($I_B$) and reference bias voltage ($V_B$).

Though the depiction and table are described in the context of a two-way set associative cache the underlying concepts are not that limited and therefore may be extended through analogous implementation to an n-way set associative cache.

Figure 5:
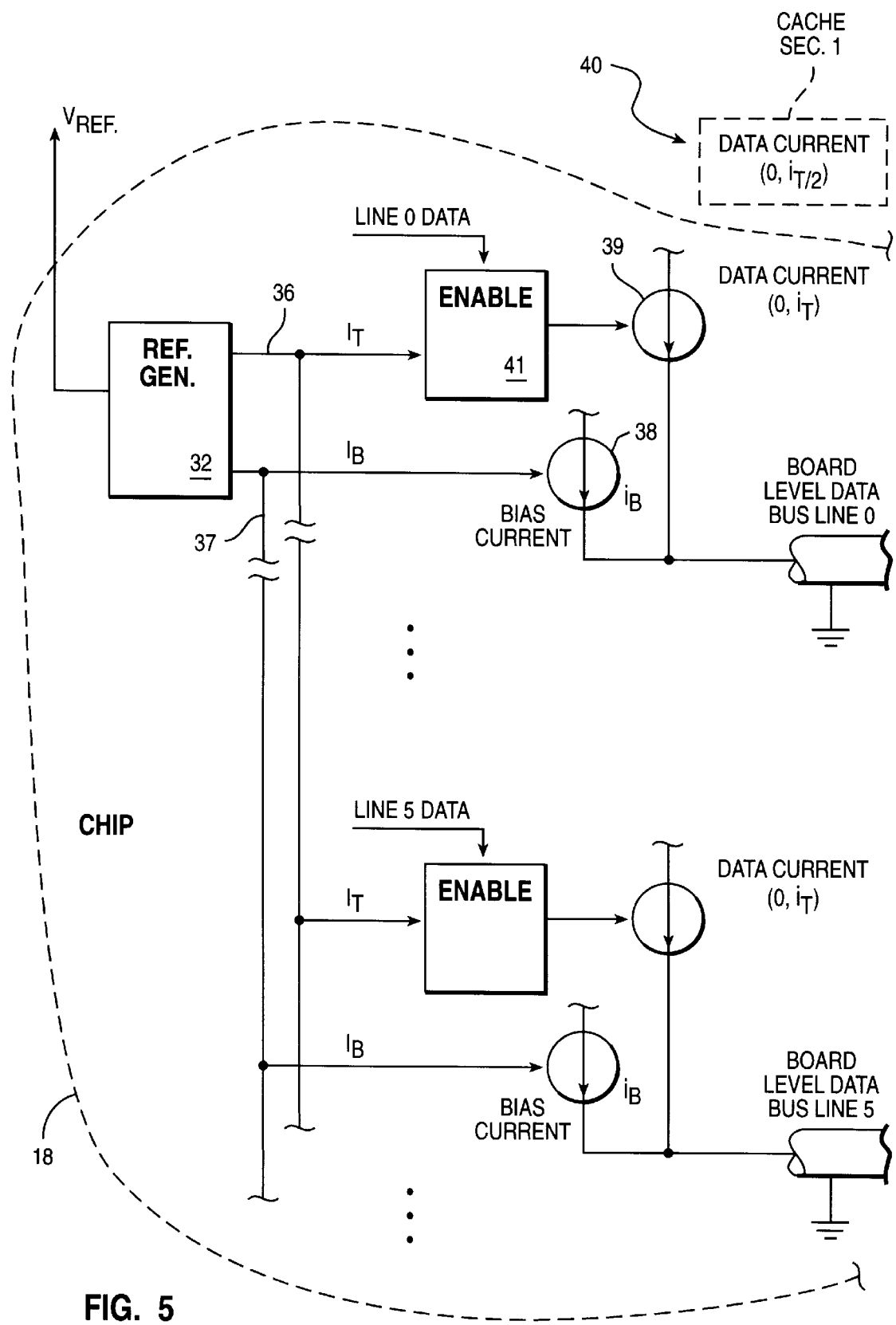
FIG. 5 is a schematic depicting current source drivers and related bias and reference functions.

FIG. 5 schematically depicts in greater detail elements from current source driver 27 in FIG. 4. In particular, the depiction shows the elements used to drive data example bus lines 0 and 5. Reference generator 32 provides transmission current; signal $I_T$ on line 36 and bias current signal $I_B$ on line 37 to pairs of current source drivers connected to each data bus lines. For example, as to data bus line 0, bias signal $I_B$ generates in driver 38 a bias current of level $i_B$. Similarly, signal $I_T$ causes current source 39 to generate a transmission current level $i_T$ when the data on line 0 is a binary 1 so as to enable gate 41. When the data on line 0 is a binary 0 gate 41 is disabled and current source 39 produces no output. Thus, current source 39 modulates between 0 output and output $i_T$ depending on the binary state of the data on line 0. The bias and data currents driving line 5 of the data bus are similarly generated and modulated. Line 0 data which enables gate 41 comes from the cache memory array in conventional manner for the respective line.

For purposes of contrast, as illustrated by dashed lines generally at 40, note that the corresponding bus line 0 of cache section B generates a bus current of 0 and $i_T/2$ for corresponding for binary data values of 0 and 1.

Reference generators 17, 32 and 33 in FIG. 4 are critical elements in the successful operation of the system. Since each reference generator resides on the corresponding integrated circuit chip, the operation of its active and passive devices reflects characteristics common to other devices on that chip. With the reference generator 17 being on a common chip with multilevel converter 16, reference generator 32 being on a common chip with current source drivers 27, and reference generator 33 being on a common chip with current source drivers 28, not only are the respective fabrication effects linked but so too are the thermal effects as the individual chips vary in temperature. The three reference generators themselves are interconnected through node 34, so that the commonly defined node voltage $V_{ref}$ can be used to precisely establish biases and transmission signals, namely $V_B$, $I_B$, and $I_T$.

Bias signal $I_B$ eminating from reference generator 33 in FIG. 4 is depicted by dashed line in that the current bias on each line of data bus 29 may originate at any one of the reference generators, or may be the result of multiple contributors as long as the net injected bias current is of value $i_B$.

Figure 6:
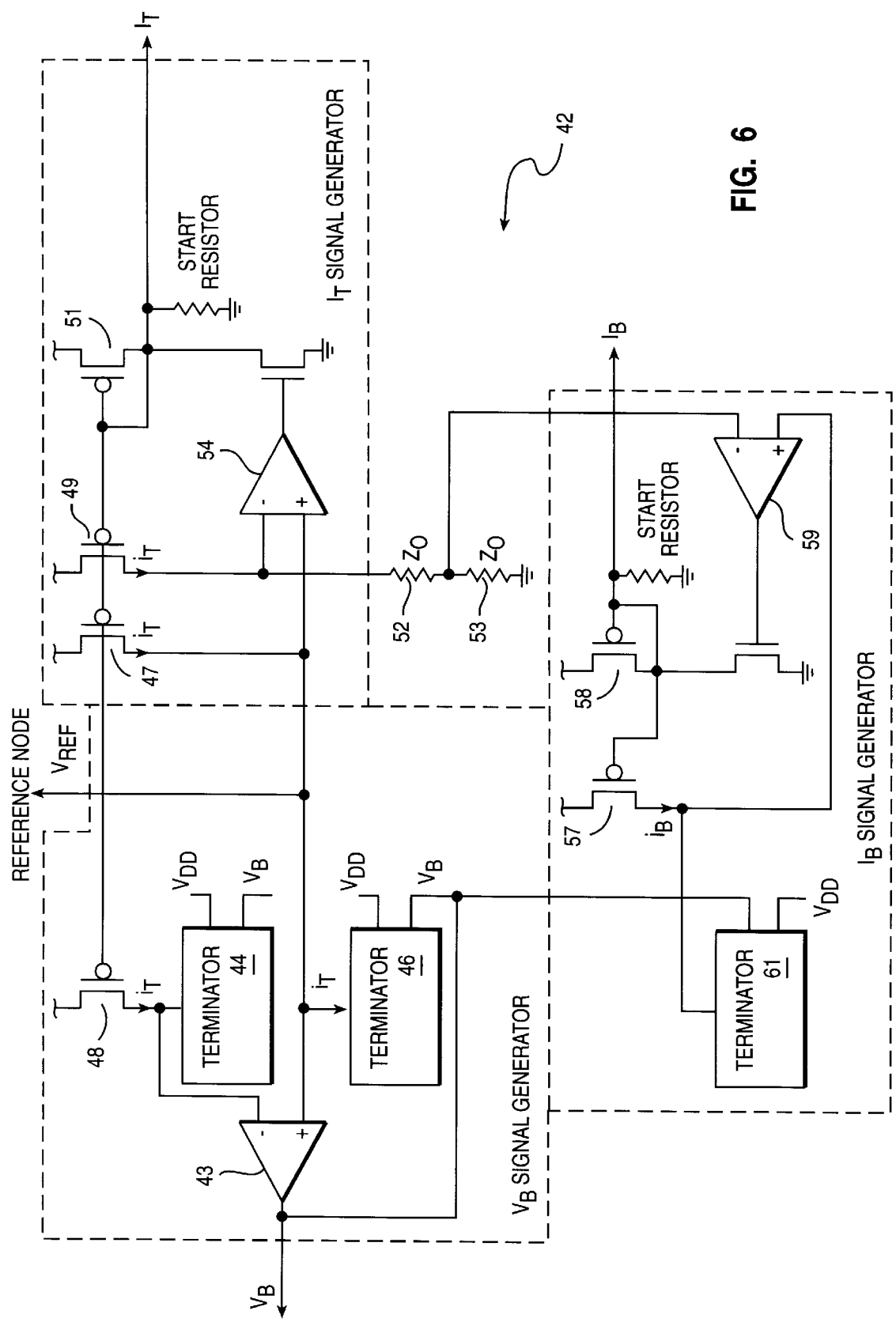
FIG. 6 is a schematic depicting a composite reference generator.

FIG. 6 schematically depicts a composite reference generator, namely one that provides all the reference signals $V_B$, $I_B$ and $I_T$ as may be used in conjunction with current source drivers 27 and 28 as well as multilevel converter 16. All the signal generators depicted in the composite reference generator of FIG. 6 may not be needed on each chip. For example, multilevel converter 16 (FIG. 4) does not utilize reference signal $I_B$, and correspondingly does not require the generation of the signal in reference generator 17. In contrast, some signals may need to be generated as an aspect of operating the reference generator, an example being signal $V_B$.

Reference generator 42 in FIG. 6 uses signal $V_B$ to balance the currents $i_T$ flowing in terminators 44 and 46, where the current $i_T$ flowing in terminator 46 is current mirror generated by field effect transistor 47 as effected by the interconnection with reference node $V_{ref}$, while the current $i_T$ flowing in field effect transistor 48 is a direct current mirror outcome. The current $i_T$ flowing in field effect transistor 49 is a current mirror of that in field effect transistor 51 and appears as a signal output $I_T$ for current mirror matching. Current $i_T$ flows through accurate resistors 52 and 53, each resistor preferably having a value $Z_o$ representing the characteristic impedance of the lines of data bus 29 (FIG. 4). Amplifier 54 adjusts the level of signal $i_T$ accordingly.

Bias signal $I_B$ is generated through the current mirror operation of field effect transistors 57 and 58 responsive to amplifier 59, where amplifier 59 detects the signal through the earlier noted characteristic impedance resistors 52 and 53 in relation to the bias current effects on terminator 61.

Other refinements of reference generator 42 in FIG. 6 are described in the aforementioned copending U.S. patent application Ser. No. 08/703,317, filed Aug. 26, 1996.

Figure 7:
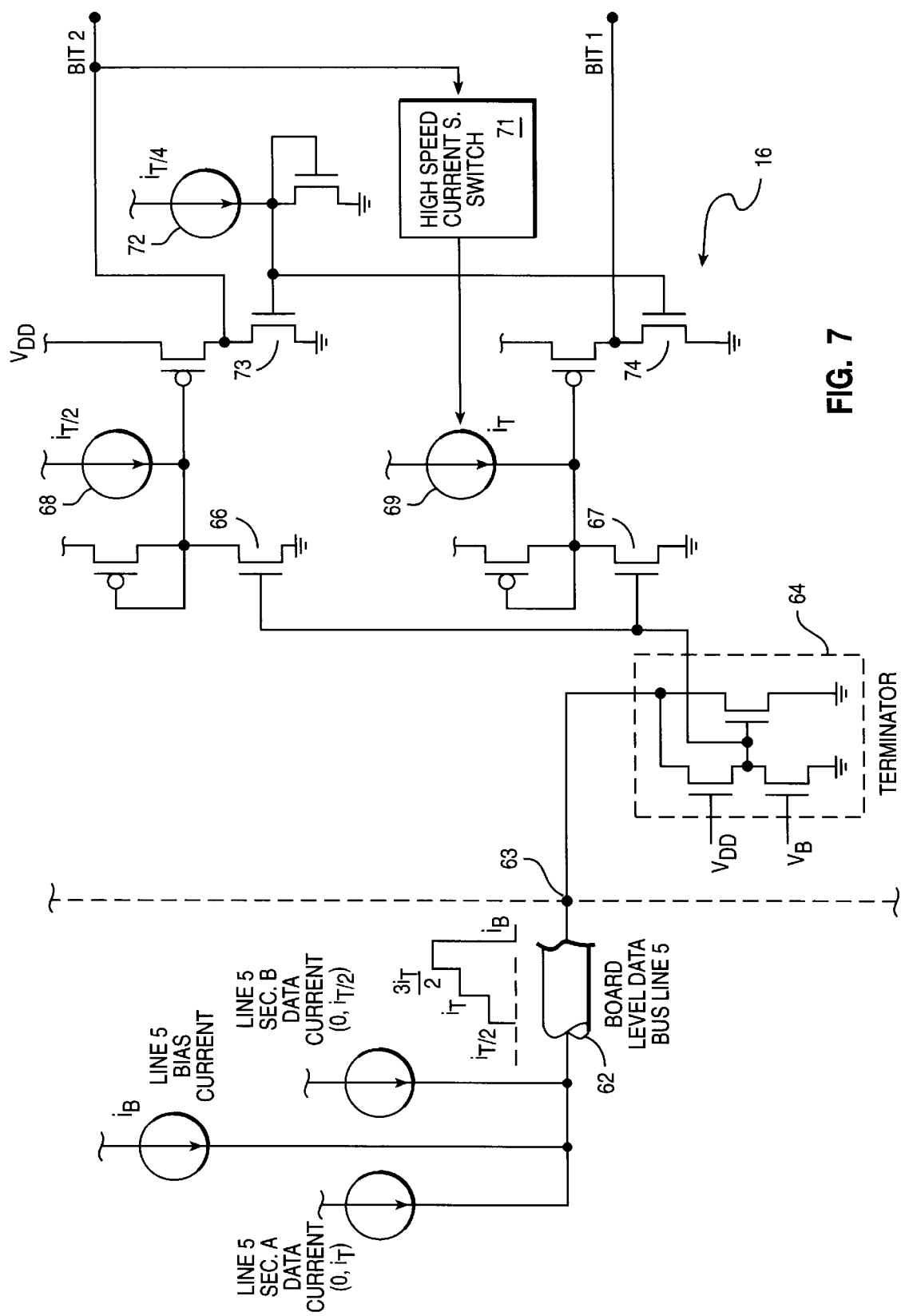
FIG. 7 is a schematic depicting a multilevel converter.

FIG. 7 depicts a detailed embodiment of multilevel converter 16 (FIG. 4) as applied to board level data bus line 5, functionally depicted as transmission line 62. Note that three current sources drive data bus line 5, namely, line 5 bias current $i_B$, line 5 data current from section A of the cache, having current levels 0 or $i_T$, and line 5 data current from the cache section B, having data current levels of 0 or $i_T/2$. The sum or net current received at node 63, representing the input for line 5 of the board level data bus 29 (FIG. 4), appears in increments as shown depending on the data content read from the cache sections. The net currents start at a base level of $i_B$, representing 0, and increase in successive $i_T/2$ increments to represent data as described in Table A. The net current appearing at node 63 is sunk by active terminator 64. Active termination 64 is preferred in that it maintains the accuracy sought through the use of multiple functionally matched reference generators.

The current sinking signal generated in active terminator 64 is replicated by current mirror transistors 66 and 67. The current sources 68 and 69 are generated using conventional current mirror techniques in response to the reference signal $i_T$ as created in reference generator 17 (FIG. 4). Note that current source 69 is selectively enabled and disabled by high speed current source switch 71. Current source 72 of magnitude $i_T/4$ is similarly generated, with a current mirrored replication in field effect transistors 73 and 74. The combination of switched and non-switched multiple level current sources in multilevel converter 16 allows one to distinguish between current levels, above the bias current $i_B$, using thresholds of $i_T/4$, $3i_T/4$ and $5i_T/4$ to differentiate between net current levels of 0, $i_T/2$, $i_T$, and $3i_T/2$.

Figure 8:
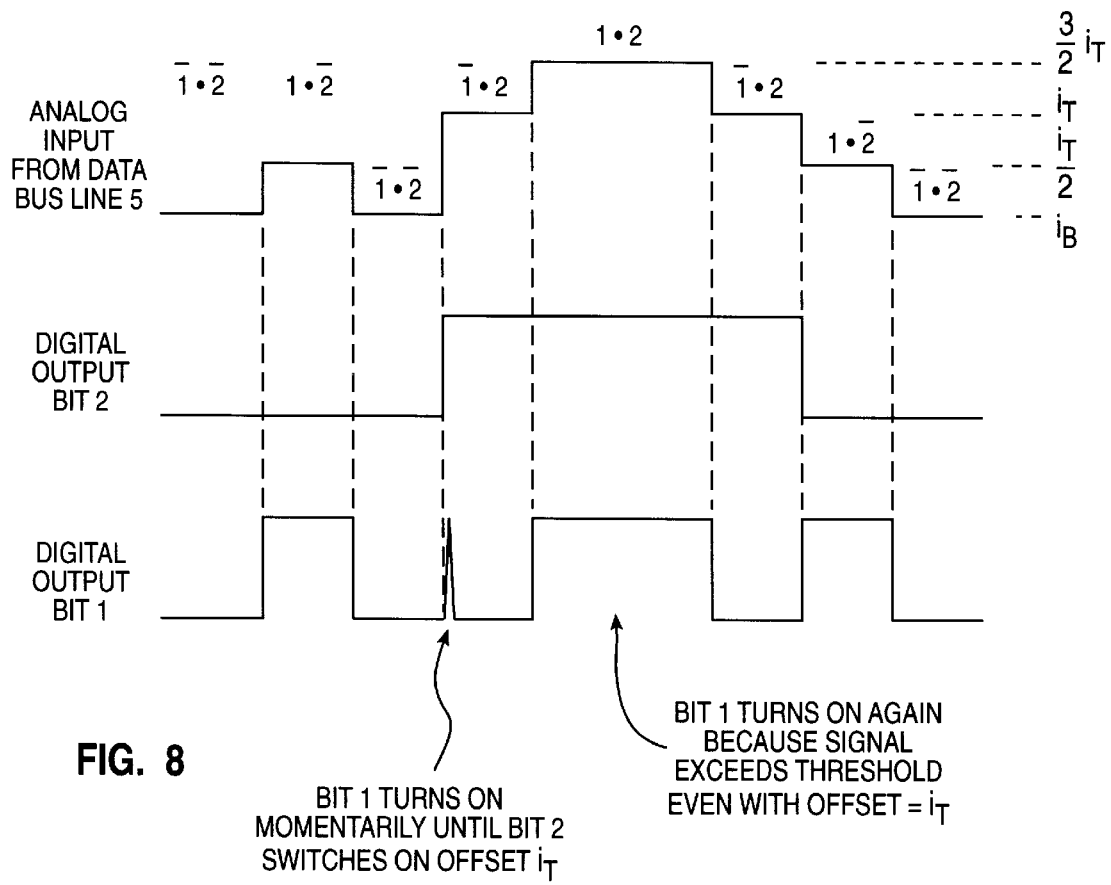
FIG. 8 is a schematic diagram depicting current levels on the bus lines and binary equivalents.

Waveforms depicting the differentiation and the corresponding binary outputs on bit lines 1 and 2 are depicted by plots in FIG. 8. The first plot shows the various levels of analog current sums, such as would appear on node 63 (FIG. 7) and the corresponding outputs on bit lines 1 and 2. High speed current. source switch 71 (FIG. 7) ensures that the turn-on of bit 1 shown by the spike in the third plot is sufficiently brief to avoid an erroneous interpretation of the decoded output.

Figure 9:
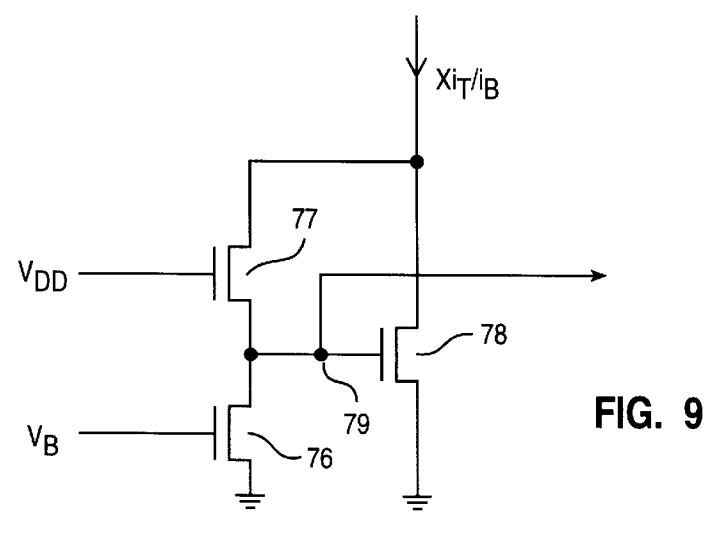
FIG. 9 is a schematic depicting an active terminator.

FIG. 9 shows active terminator transistors 76, 77, and 78. Note that transistor 77 is biased by the supply voltage $V_{DD}$ common to the other field effect transistor devices in the chips. Transistor 76, however, is subject to a gate drive defined by reference voltage $V_B$. The currents being terminated, various levels of $i_T$ and $i_B$, generate an output signal from node 79 suitable for current mirror replication in the manner used repeatedly in the present invention. The active terminator in FIG. 9 is selected to maximize the match of transistor characteristics as may appear on different integrated circuit chips and as may be further affected by temperature variations.

Figure 10:
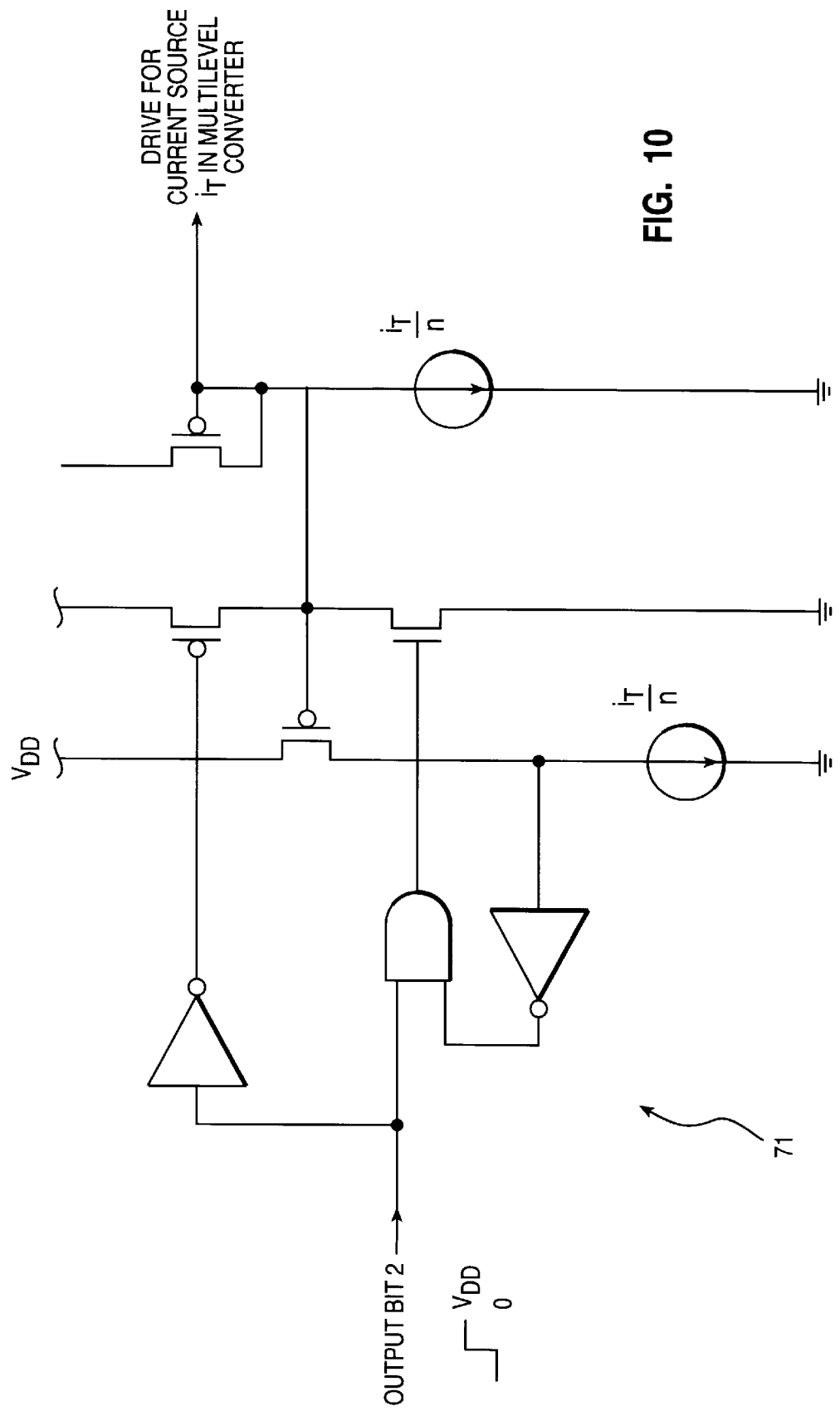
FIG. 10 is a schematic depicting a high speed current source switch.

An implementation of high speed current source switch 71 appears in FIG. 10 of the drawings. The switch is driven by bit line 2 and is utilized to enable current source 69 (FIG. 7) with minimum delay. The current sources $i_T/n$ are generated through current mirror scaled replication of signal $i_T$ from reference generator 17 (FIG. 4).

The fundamental concept of simultaneously transmitting data from sections of a set associative cache as embodied for a two-way set associative cache in FIG. 4 clearly is applicable for more than two sections, adjusting accordingly for the current source driver and multilevel converter granularity. The fundamental underlying concepts are fully applicable to the extent that integrated circuit tolerances permit differentiation between levels.

The concepts embodied in the two-way set associative cache and simultaneous data transmission over a common bus are equally applicable to other forms of simultaneous multilevel transmissions of information over such bus. The key objective is to utilize accurately referenced current sources at the transmitting end and an accurately referenced multilevel converter at the receiving end, the accuracy preferably being established and maintained through the use of multiple reference generators and a common reference node.

It will be understood that those skilled in the art that the embodiment set forth hereinbefore is merely exemplary of the numerous arrangements by which the invention may be practiced, and as such may be replaced by equivalents without departing from the invention which will now be defined by appended claims.

We claim:

1. Late select architecture for a set associative cache having two or more cache sections that provide data to a processor over a common bus, comprising:

means for selecting digital data by addresses in the cache sections;

means for generating analog currents in amounts attributable to cache sections and in response to the digital data selected in the cache sections;

means for injecting the generated analog currents into lines of the common bus;

means for detecting net analog currents injected in the lines of the common bus;

means for converting the detected net analog currents into digital data attributable to individual cache sections; and means for selecting the desired digital data from among digital data attributable to individual cache sections in response to a late select signal.

2. The apparatus recited in claim 1, further comprising a reference node linking the means for generating analog currents to the means for converting the detected sums.

3. The apparatus recited in claim 2, wherein the processor is on a different integrated circuit chip from the cache sections.

4. The apparatus recited in claim 3, wherein the means for detecting net analog currents is comprised of an active terminator with current bias.

5. The apparatus recited in claim 4, wherein the means for selecting the desired digital data comprises a multiplexer on the processor integrated circuit chip.

6. The apparatus recited in claim 2, wherein the reference node conveys a reference voltage among integrated circuit chips, and in conjunction with active terminators provides current mirror replication of current magnitudes.

7. The apparatus recited in claim 1, wherein the processor is on a different integrated circuit chip from the cache sections.

8. The apparatus recited in claim 7, wherein the means for detecting net analog currents is comprised of an active terminator with current bias.

9. The apparatus recited in claim 8, wherein the means for selecting the desired digital data comprises a multiplexer on the processor integrated circuit chip.

10. The apparatus recited in claim 9, wherein the means for converting detected net analog currents is a current to digital voltage converter on the processor integrated circuit chip.

11. Apparatus for simultaneously transmitting digital data over a common bus using multilevel current sources and current summing, comprising:

means for generating in a first device connected to the common bus currents of first or second magnitude in representation of respective first or second binary states in the first device;

means for generating in a second device connected to the common bus currents of first or third magnitude in representation of first and second binary states in the second device;

means for selectively injecting first or second magnitude currents from the first device, and first or third magnitude currents from the second device, into a first line of the bus responsive to the binary states to be represented by each device on the first line;

means for detecting respective individual net sums of the injected currents in the first line of the bus;

reference node linking the means for generating in the first device, the means for generating in the second device, and the means for detecting respective individual net sums, to provide a common reference voltage for deriving the first, second and third magnitude currents; and means for converting detected net sums of injected currents into first and second binary values individually attributable to first and second devices responsive to the voltage on the reference node.

12. The apparatus recited in claim 11, wherein the first magnitude of injected current is substantially at the zero level, and the second and third magnitudes of injected current are at different non-zero levels.

13. The apparatus recited in claim 12, wherein the means for detecting the individual net sums of the injected current and the first device are on different integrated circuit chips.

14. The apparatus recited in claim 13, wherein the means for detecting the individual net sums of injected current comprise active terminators with current bias.

15. The apparatus recited in claim 14, wherein the first and second devices are integrated circuit memory arrays, and the means for detecting the individual net sums of injected current is on a processor integrated circuit chip.

16. The apparatus recited in claim 15, wherein the means for converting detected net sums of injected currents are analog current to digital voltage converters on the processor integrated circuit chip.

17. The apparatus recited in claim 11, wherein the means for detecting the individual net sums of the injected current and the first device are on different integrated circuit chips.

18. The apparatus recited in claim 17, wherein the means for detecting the individual net sums of injected current comprise active terminators with current bias.

19. The apparatus recited in claim 18, wherein the first and second devices are integrated circuit memory arrays, and the means for detecting the individual net sums of injected current is on a processor integrated circuit chip.

20. The apparatus recited in claim 19, wherein the means for converting detected net sums of injected currents are analog current to digital voltage converters on the processor integrated circuit chip.

* * * * *